United States Patent
Hachisuga

(10) Patent No.: US 11,199,732 B2
(45) Date of Patent: Dec. 14, 2021

(54) OPTICAL DEVICE AND IMAGE READING APPARATUS

(71) Applicant: FUJIFILM Business Innovation Corp., Tokyo (JP)

(72) Inventor: Masaki Hachisuga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 82 days.

(21) Appl. No.: 16/721,952

(22) Filed: Dec. 20, 2019

(65) Prior Publication Data

US 2020/0333642 A1    Oct. 22, 2020

(30) Foreign Application Priority Data

Apr. 18, 2019  (JP) .............................. JP2019-079676

(51) Int. Cl.
*H04N 1/04* (2006.01)
*G02F 1/03* (2006.01)
*G02F 1/1335* (2006.01)

(52) U.S. Cl.
CPC ...... *G02F 1/0311* (2013.01); *G02F 1/133512* (2013.01); *G02F 1/133607* (2021.01)

(58) Field of Classification Search
CPC ............. G02F 1/0311; G02F 1/133512; G02F 1/133607

USPC ................ 358/475, 482, 483, 509; 359/247; 399/211

See application file for complete search history.

(56) References Cited

U.S. PATENT DOCUMENTS

| | | | | |
|---|---|---|---|---|
| 2008/0080046 | A1* | 4/2008 | Yamamura | B41J 2/451 359/435 |
| 2014/0160573 | A1* | 6/2014 | Teramura | G02B 3/0062 359/619 |
| 2020/0310004 | A1* | 10/2020 | Hachisuga | H04N 1/00997 |
| 2021/0234986 | A1* | 7/2021 | Hachisuga | H04N 1/0306 |

FOREIGN PATENT DOCUMENTS

| | | | | |
|---|---|---|---|---|
| JP | 57210307 A | * | 12/1982 | .......... G02B 3/0056 |
| JP | 2003302504 | | 10/2003 | |
| JP | 2015022163 | | 2/2015 | |
| JP | 2016186580 | | 10/2016 | |

\* cited by examiner

*Primary Examiner* — Cheukfan Lee
(74) *Attorney, Agent, or Firm* — JCIPRNET

(57) ABSTRACT

An optical device includes a lens body including plural lenses of which optical axes are arranged alongside each other, and a light shielding body that is disposed with respect to the lens body and shields a part of light passing through the plural lenses, in which the light shielding body has a base that is provided, at a position shifted from the optical axes of the plural lenses, along an arrangement direction in which the plural lenses are arranged, and plural projecting portions that are positioned between the plural lenses and project from the base in an intersection direction intersecting the arrangement direction.

10 Claims, 13 Drawing Sheets

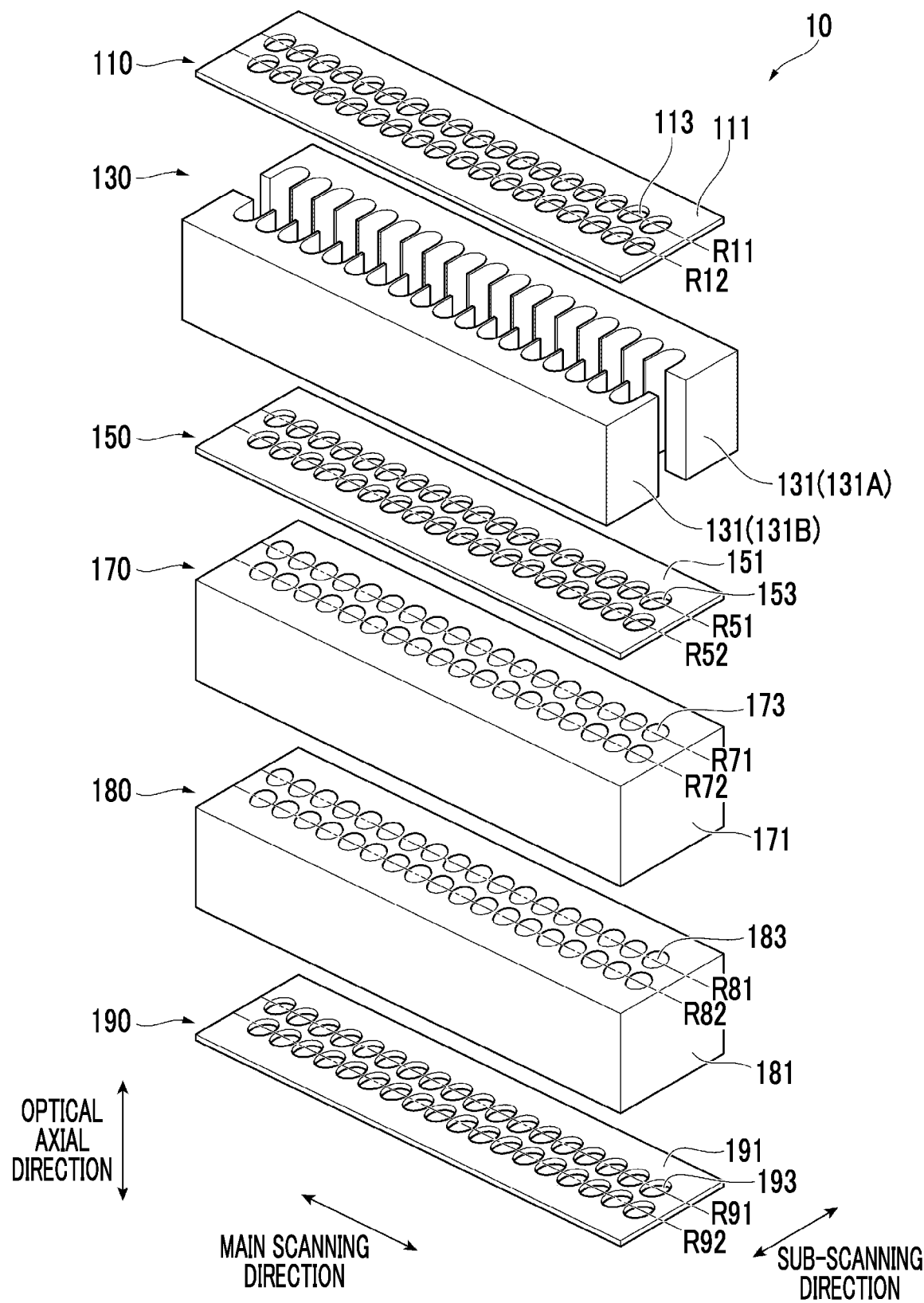

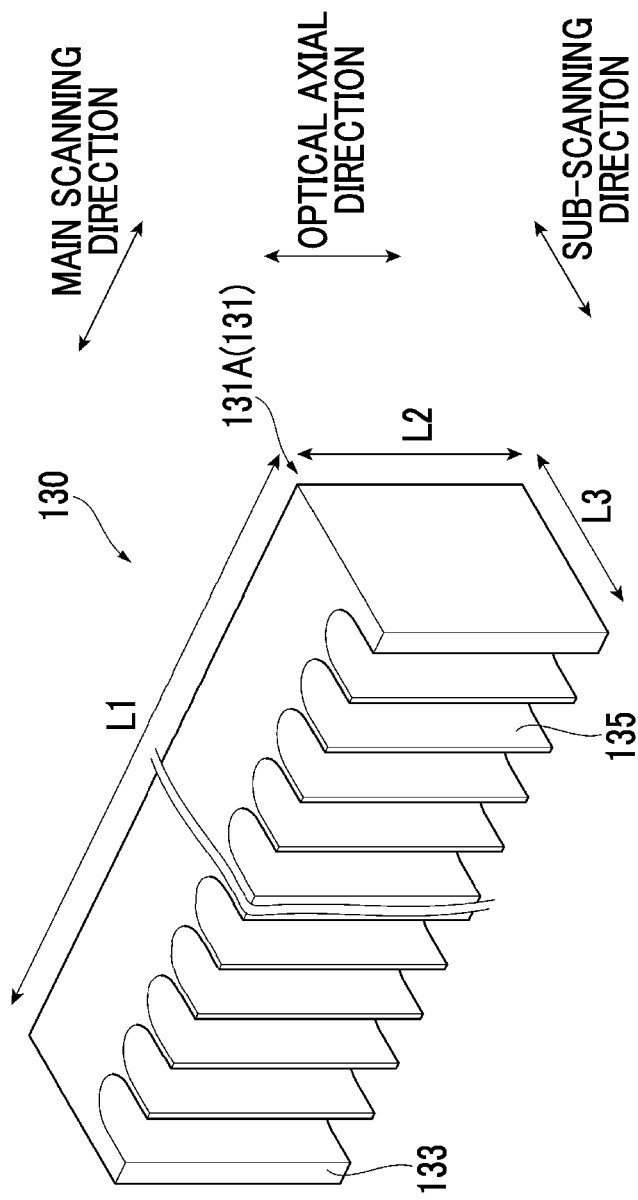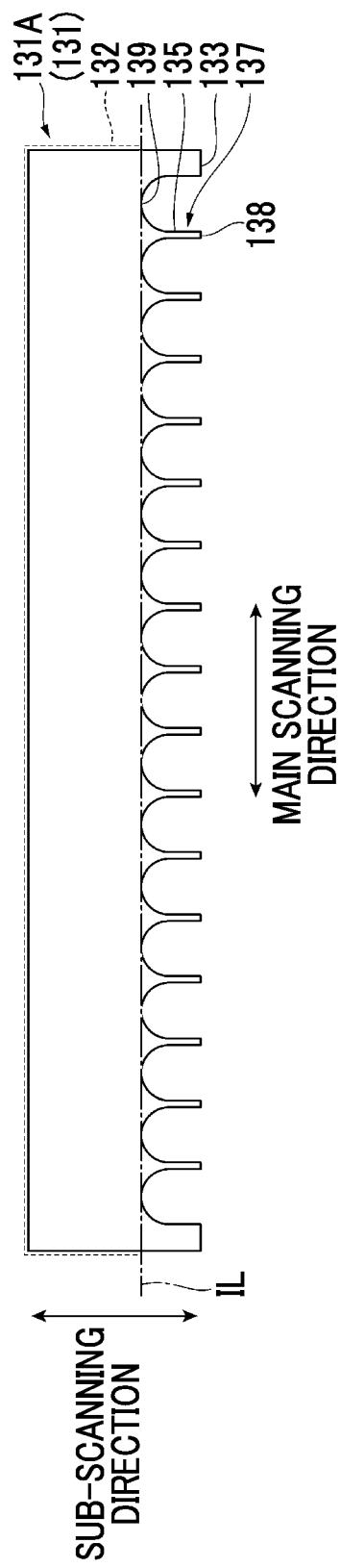

CIRCLE

SEMICIRCLE 0.75

SEMICIRCLE 0.6

LINE 0.18

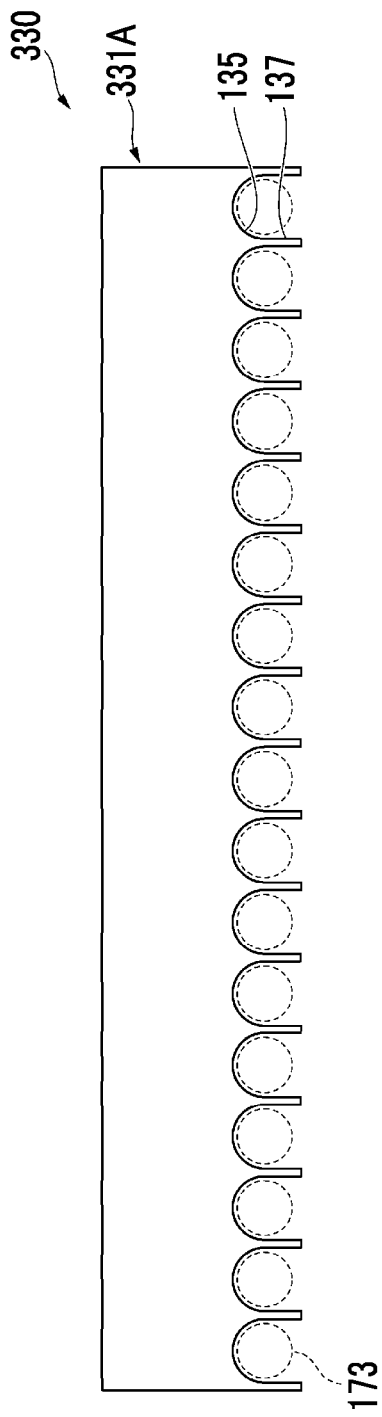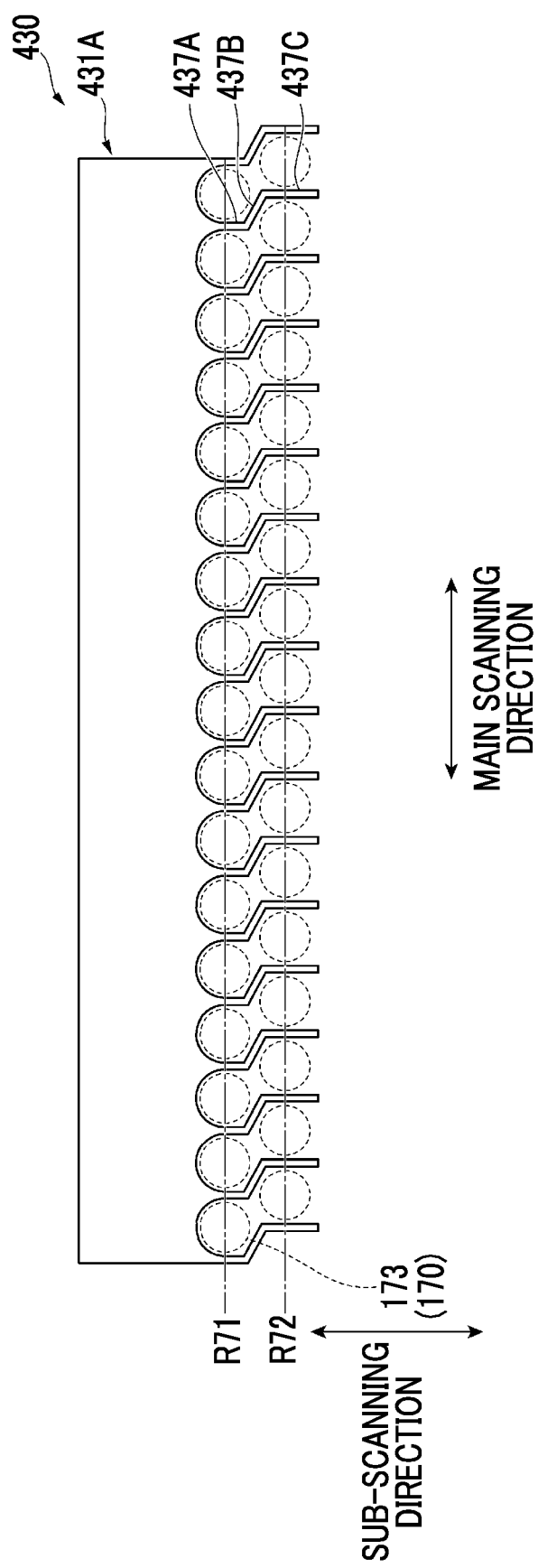

OPTICAL DEVICE AND IMAGE READING APPARATUS

CROSS-REFERENCE TO RELATED APPLICATION

This application is based on and claims priority under 35 USC 119 from Japanese Patent Application No. 2019-079676 filed Apr. 18, 2019.

BACKGROUND

(i) Technical Field

The present invention relates to an optical device and an image reading apparatus.

(ii) Related Art

JP2003-302504A discloses a lens array unit including at least one lens array in which a plurality of lenses are arranged to form a line and which includes a plurality of first lens surfaces for incident light and a plurality of second lens surfaces for emitting light, a first light shielding mask which has a plurality of through-holes penetrating in an axial length direction of each of lenses and covers a front surface of the lens array in a state in which a plurality of through-holes are positioned on the front surface of the first lens surface, and a second light shielding mask which has a plurality of through-holes penetrating in an axial length direction of each of lenses and is provided on a rear surface of the lens array such that a plurality of through-holes are positioned on the rear surface of the second lens surface.

SUMMARY

Meanwhile, for suppressing stray light, a light shielding body which shields a part of light passing through the lens may be provided to a lens body including a plurality of lenses of which optical axes are arranged alongside each other. Also, as such a light shielding body, a configuration in which a through-hole through which light passes is provided at a position corresponding to each lens is known. Here, in order to reduce a distance between the lenses in the lens body, it is necessary also to reduce a distance between the through-holes in the light shielding body. However, reducing the distance between the through-holes, shaping failure in the light shielding body is likely to occur.

Aspects of non-limiting embodiments of the present disclosure relate to an optical device and an image reading apparatus that suppress shaping failure in a light shielding body as compared with a case where a plurality of through-holes are formed in the light shielding body.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an optical device including a lens body including a plurality of lenses of which optical axes are arranged alongside each other, and a light shielding body that is disposed with respect to the lens body and shields a part of light passing through the plurality of lenses, in which the light shielding body has a base that is provided, at a position shifted from the optical axes of the plurality of lenses, along an arrangement direction in which the plurality of lenses are arranged, and a plurality of projecting portions that are positioned between the plurality of lenses and project from the base in an intersection direction intersecting the arrangement direction.

BRIEF DESCRIPTION OF THE DRAWINGS

Exemplary embodiment(s) of the present invention will be described in detail based on the following figures, wherein:

FIG. 3 is an exploded perspective view of a lens array unit to which the present exemplary embodiment is applied;

FIGS. 4A and 4B are diagrams for explaining a light shielding wall;

FIGS. 5-2C and 5-2D are diagrams for explaining arrangement of the light shielding wall in another exemplary embodiment;

FIGS. 9A and 9B are diagrams for explaining another modification example of the wall member;

DETAILED DESCRIPTION

Hereinafter, exemplary embodiments of the present invention will be described in detail with reference to drawings.

Image Forming Apparatus 100

Figure 1:
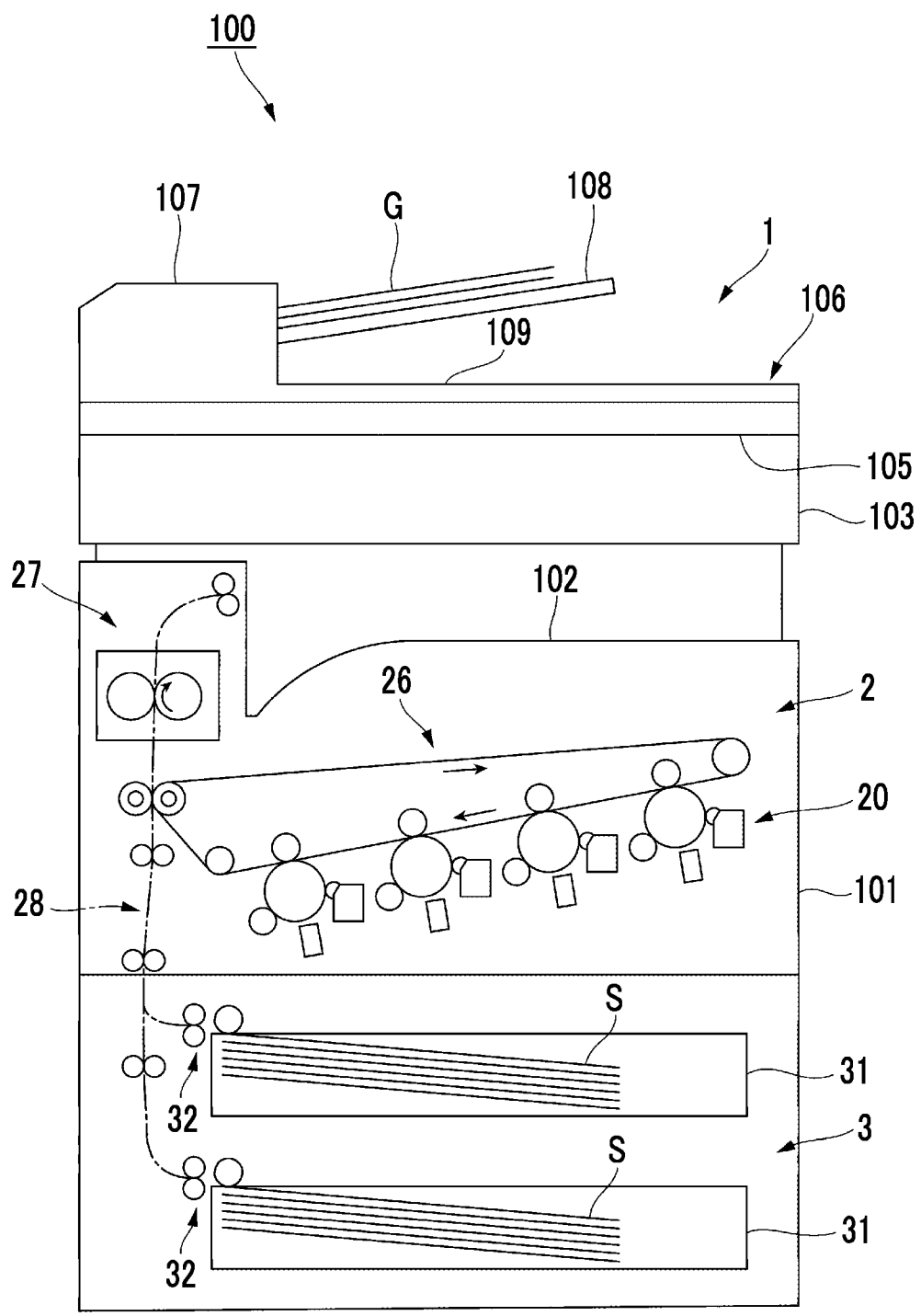
FIG. 1 is a schematic configuration diagram of an image forming apparatus to which the present exemplary embodiment is applied.

FIG. 1 is a schematic configuration diagram of an image forming apparatus 100 to which the present exemplary embodiment is applied.

As shown in FIG. 1, the image forming apparatus 100 includes a document reading apparatus 1 that reads information of a document G, an image forming unit 2 that forms an image on a recording sheet S based on the information on the document (read image) read by the document reading apparatus 1, and a paper feeding unit 3 that feeds the recording sheet S supplied to the image forming unit 2. The image forming apparatus 100 accommodates the image forming unit 2 and the paper feeding unit 3 in a main body 101, and has the document reading apparatus 1 disposed above the main body 101. The main body 101 has, on an upper surface portion thereof, a discharging and accommodating unit 102 that discharges and accommodates the recording sheet S on which an image is formed.

The document reading apparatus 1 has a housing 103. Also, the document reading apparatus 1 has, on the upper surface portion of the housing 103, a light transparent document placing table 105 on which the document G is placed, and a document cover 106 that covers the document placing table 105 and can be opened and closed with respect to the housing 103. On the document cover 106, an auto document feeding unit 107 that transports the document G to a reading position and discharges the read document G, a document tray 108 on which the document G transported from the auto document feeding unit 107 is placed, and an accommodating unit 109 that accommodates the document G discharged from the auto document feeding unit 107 are provided.

The image forming unit 2 includes an image formation unit 20 that forms toner images having colors of yellow (Y), magenta (M), cyan (C), and black (K), for example, by an electrographic method, an intermediate transfer unit 26 that transports the toner image formed by the image formation unit 20 to transfer on the recording sheet S, and a fixing unit 27 that fixes the toner image transferred on the recording sheet S by the intermediate transfer unit 26.

The paper feeding unit 3 has a drawer type container 31 on which a plurality of the recording sheets S of predetermined sizes or types can be placed, and a feeding device 32 that feeds the recording sheet S accommodated in the container 31 to a transporting path one by one. A supply transporting path 28 through which the recording sheet S fed from the paper feeding unit 3 is transported to a secondary transfer position disposed between the paper feeding unit 3 and the image forming unit 2.

Hereinafter, a basic operation of the image forming apparatus 100 will be described.

First, in the document reading apparatus 1, the document G is placed on any one of the document placing table 105 or the document tray 108 by a user. Then, in a case where the user operates an operation button (not shown) or the like, the document reading apparatus receives an instruction of document reading, then the reading operation with respect to the document G starts. That is, the document reading apparatus 1 acquires reading information on the document G. Then, the image forming unit 2 executes an image forming operation based on the reading information on the document G received from the document reading apparatus 1. At this time, the recording sheet S is fed from the paper feeding unit 3 in accordance with the operation of the image forming unit 2. Then, the recording sheet S is discharged to the discharging and accommodating unit 102 after the toner image is fixed to the recording sheet in the image forming unit 2. The image forming operations described above are repeated by the number of documents G and the number of image forming sheets in the same manner.

Document Reading Apparatus 1

Figure 2:
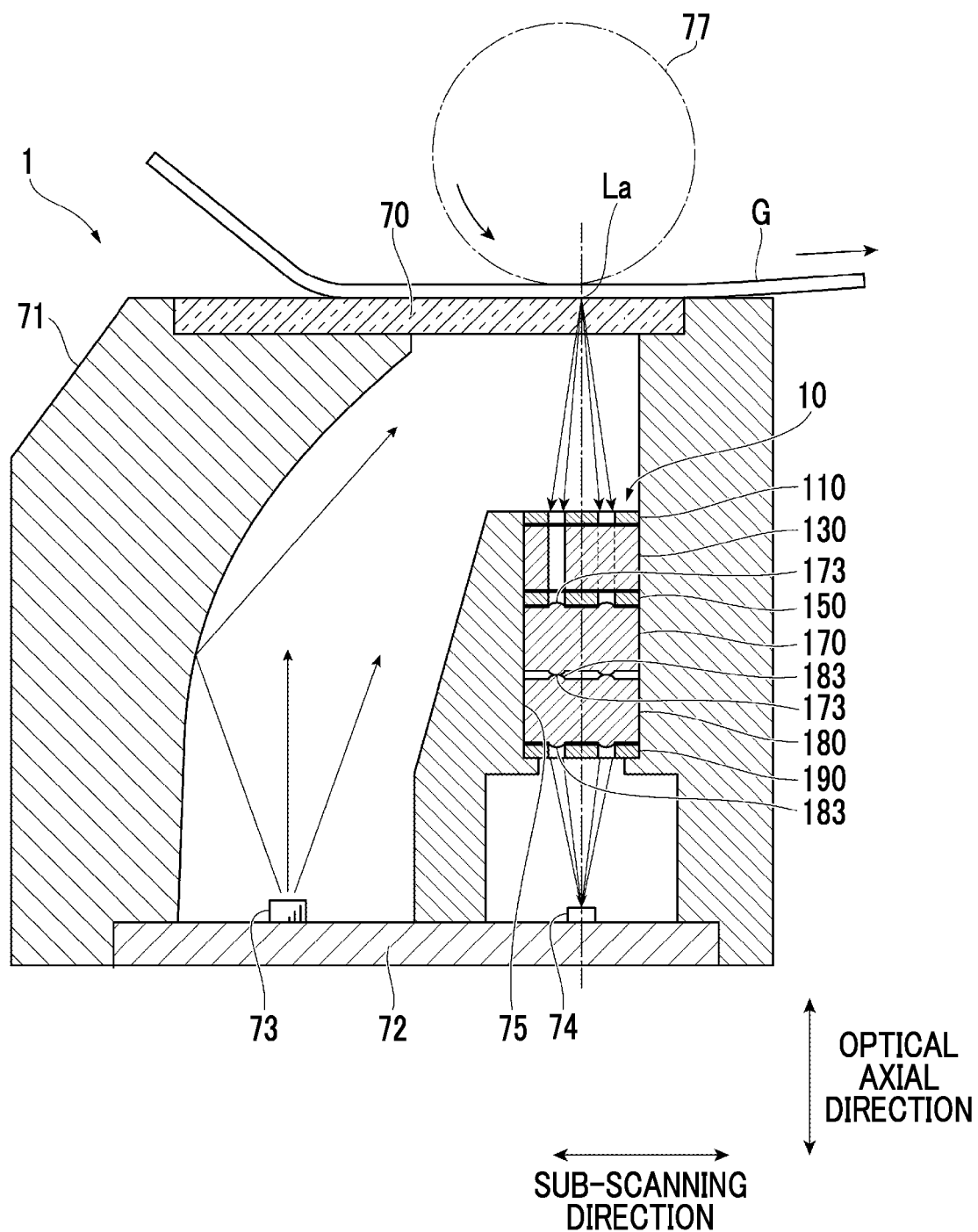
FIG. 2 is a schematic configuration diagram of a document reading apparatus to which the present exemplary embodiment is applied.

FIG. 2 is a schematic configuration diagram of a document reading apparatus 1 to which the present exemplary embodiment is applied.

Hereinafter, the document reading apparatus 1 to which the present exemplary embodiment is applied will be described with reference to FIG. 2. As shown in 2, the document reading apparatus 1 includes a transparent plate 70, a synthetic resin case 71 supporting the transparent plate 70, and a substrate 72 assembled to the bottom of the case 71. On a surface of the substrate 72, a plurality of spot light sources 73 arranged in rows at intervals in a main scanning direction (a direction orthogonal to a paper surface) and a plurality of light receiving elements 74 arranged in the same direction with a plurality of light sources 73 are provided.

Each of the sources 73 is constituted by using a light emitting diode. Each of the light receiving elements 74 has a photoelectric conversion function, and in a case where light is received, the light receiving element 74 outputs a signal of an output level corresponding to a light receiving amount, specifically, outputs an image signal.

Here, the document reading apparatus 1 includes a lens array unit 10 between the transparent plate 70 and each light receiving element 74. Although a detailed configuration of the lens array unit 10 will be described later, the lens array unit 10 as shown in FIG. 2 is disposed in a recessed groove 75 provided in the case 71. Also, on the surface portion of the transparent plate 70 as shown in FIG. 2, a portion facing the lens array unit 10 is an image reading region La extending in the main scanning direction. The image reading region La is irradiated with light from each light source 73.

In the document reading apparatus 1, light from the light source 73 is emitted to the document G guided onto the surface of the transparent plate 70 by the auto document feeding unit 107 (see FIG. 1). Reflected light of light emitted to the document G proceeds toward the lens array unit 10. Then, by the operation of the lens array unit 10, the image for one line of the document G in the image reading region La is formed on a plurality of light receiving elements 74 in an erect equal-magnified manner. Therefore, a plurality of light receiving elements 74 outputs the image signals by one line corresponding to the image of the document G. Such a reading process is repeatedly performed multiple times in the process that the document G is transported by, for example, a platen roller 77 included in the auto document feeding unit 107 in a sub-scanning direction.

In the following description, the direction from the image reading region La to the light receiving element 74, that is, a vertical direction in FIG. 2 may refer to as an optical axial direction.

Lens Array Unit 10

FIG. 3 is an exploded perspective view of a lens array unit 10 to which the present exemplary embodiment is applied.

Hereinafter, the lens array unit 10 to which the present exemplary embodiment is applied will be described with reference to FIG. 3.

As shown in FIG. 3, the lens array unit 10 includes a first light shielding film 110, a light shielding wall 130, a second light shielding film 150, a first lens array 170, a second lens array 180, and a third light shielding film 190. More specifically, in the lens array unit 10 as shown in FIG. 3, the first light shielding film 110, the light shielding wall 130, the second light shielding film 150, the first lens array 170, the second lens array 180, and the third light shielding film 190 are stacked on top of each other in this order, and are bonded by an adhesive or the like so as to be integrated with each other. Hereinafter, each member included in the lens array unit 10 will be described.

First, the first lens array 170 and the second lens array 180 will be described.

Each of the first lens array 170 and the second lens array 180 is a member having substantially rectangular parallelepiped shape. More specifically, the first lens array 170 and the second lens array 180 as shown are a pair of lens members and have shapes coinciding with each other.

The first lens array 170 has a substantially rectangular parallelepiped first support member 171, and a plurality of first lenses 173 formed on the front and back surfaces of the first support member 171. A plurality of first lenses 173 are configured such that optical axes thereof are arranged alongside each other. Regarding the description that the optical axes of a plurality of first lenses 173 are alongside each other, each of the first lenses 173 need only cause the image for one line of the document G in the image reading region La to be formed on a plurality of light receiving elements 74 in an erect equal-magnified manner, and the optical axes of a plurality of first lenses 173 may not only be parallel to each other, but also be misaligned with each other. Also, a plurality of first lenses 173 are arranged in a first row R71 and a second row R72 along the main scanning direction. A plurality of first lenses 173 are disposed in a staggered manner. That is, the first lenses 173 which constitute the first row R71 and the first lenses 173 which constitute the second row R72 are shifted from each other in the main scanning direction. The first lenses 173 in the first row R71 are disposed at predetermined intervals, that is, pitches. Also, the first lenses 173 in the second row R72 are disposed at the identical interval with the lenses in the first row R71.

The second lens array 180 has a substantially rectangular parallelepiped second support member 181, and a plurality of second lenses 183 formed on the front and back surfaces of the second support member 181. A plurality of second lenses 183 are configured such that optical axes thereof are alongside each other. Regarding the description that the optical axes of a plurality of second lenses 183 are alongside each other, each of the second lenses 183 need only cause the image for one line of the document G in the image reading region La to be formed on a plurality of light receiving elements 74 in an erect equal-magnified manner, and the optical axes of a plurality of second lenses 183 may not only be parallel to each other, but also be misaligned with each other. Also, a plurality of second lenses 183 are arranged in a first row R81 and a second row R82 along the main scanning direction. A plurality of second lenses 183 are disposed in a staggered manner. That is, the second lenses 183 which constitute the first row R81 and the second lenses 183 which constitute the second row R82 are shifted from each other in the main scanning direction. The second lenses 183 in the first row R81 are disposed at predetermined intervals. Also, the second lenses 183 in the second row R82 are disposed at the identical interval with the lenses in the first row R81.

In the shown example, the first lens array 170 and the second lens array 180 are disposed such that each of the first lenses 173 and each of the second lenses 183 face each other. More specifically, the optical axis of the first lens 173 and the optical axis of the second lens 183 are aligned to coincide with each other. The first lens array 170 and the second lens array 180 are integrally formed by injection molding, for example, using an optical resin having a light transmitting property. In the following description, in a case where it is unnecessary to distinguish between the optical axis of the first lens 173 and the optical axis of the second lens 183, both may be simply referred to as an "optical axis of the first lens 173".

Hereinafter, the first light shielding film 110, the second light shielding film 150, and the third light shielding film 190 will be described. The first light shielding film 110, the second light shielding film 150, and the third light shielding film 190 are elongated thin plate members. In the shown example, the first light shielding film 110, the second light shielding film 150, and the third light shielding film 190 are shaped to coincide with each other.

The first light shielding film 110 has a first plate surface 111 having a substantially rectangular shape in a plan view. A plurality of first through-holes 113 are formed in the first plate surface 111. Here, each first through-hole 113 is substantially circular. The positions of first through-holes 113 correspond to the first lens 173 and the second lens 183.

That is, each first through-hole 113 is formed at a position through which the optical axis of the first lens 173 passes. Also, the first through-holes 113 are arranged in a first row R11 and a second row R12 along the main scanning direction. More specifically, each optical axis of the first lens 173 corresponds to each first through-hole 113 that is a passing region.

In the shown example, the first light shielding film 110 is thinner than the light shielding wall 130. That is, the first light shielding film 110 has a smaller dimension than the dimension of the light shielding wall 130 in the optical axial direction. Further, the first light shielding film 110 is formed of resin materials mixed with black pigment (for example, an acrylic resin). The first light shielding film 110 blocks the configuration not contributing to imaging the first lens 173 and second lens 183. More specifically, the first light shielding film 110 is provided on a side opposite the first lens 173 and the second lens 183 in the optical axial direction with the light shielding wall 130 interposed therebetween, in other words, on the upper surface of the light shielding wall 130, and shields a part of light directed to the light shielding wall 130. The first light shielding film 110 is an example of a cover member that covers facing regions of a first wall member 131A and a second wall member 131B described later. The first light shielding film 110 that is an example of the cower member may cause a plurality of first lenses 173 and the optical axes of a plurality of first lenses 173 to pass by covering the first lenses 173 of two rows.

As described above, the first light shielding film 110, the second light shielding film 150, and the third light shielding film 190 are shaped to coincide with each other, thus a detailed description will be omitted, but the second light shielding film 150 has a second plate surface 151 in which a plurality of second through-holes 153 are formed. Here, each second through-hole 153 is formed at a position through which the optical axis of the first lens 173 passes. Also, the second through-holes 153 are provided in a first row R51 and a second row R52.

The third light shielding film 190 has a third plate surface 191 in which a plurality of third through-holes 193 are formed. Here, each third through-hole 193 is formed at a position through which the optical axis of the first lens 173 passes. Also, the third through-holes 193 are provided in a first row R91 and a second row R92.

Figure 8:
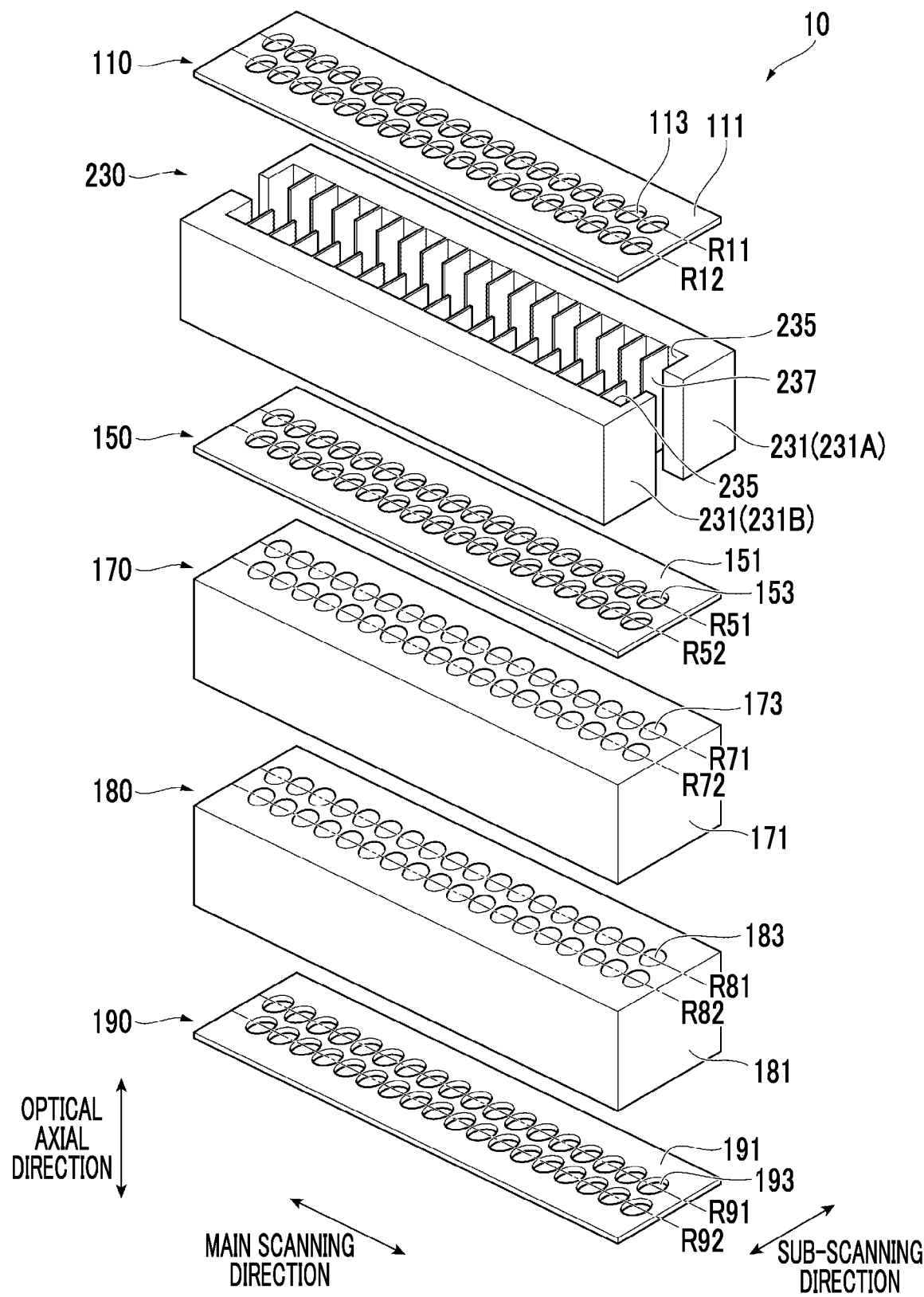
FIG. 8 is a diagram for explaining a modification example of a wall member.

Although details will be described later, in a case where a configuration in which the light shielding wall 230 does not have a curved surface as shown in FIG. 8 is adopted instead of a configuration in which an optical axis groove 135 of the light shielding wall 130 is substantially U-shaped as shown in FIG. 3, the influence of the first light shielding film 110 increases. In other words, the shape of the portion covered by the first light shielding film 110 is, for example, more preferably closer to the shape of the lens than the light shielding wall 230 described later. Since the light shielding wall 230 is longer than the first light shielding film 110 in the optical axial direction, it may be relatively difficult to obtain dimensional accuracy, but the first light shielding film 110 is relatively easily shaped due to the thin thickness. Light entering the first lens 173 in a case where the first light shielding film 110 is combined with the light shielding wall 230 closes to light entering the first lens 173 in a case where the first light shielding film 110 is formed into a shape of the light shielding wall 130.

Light Shielding Wall 130

FIGS. 4A and 4B are diagrams for explaining a light shielding wall 130. More specifically, FIG. 4A is a perspective view of the first wall member 131A and FIG. 4B is a top view of the first wall member 131A.

Figures 1A, 5:
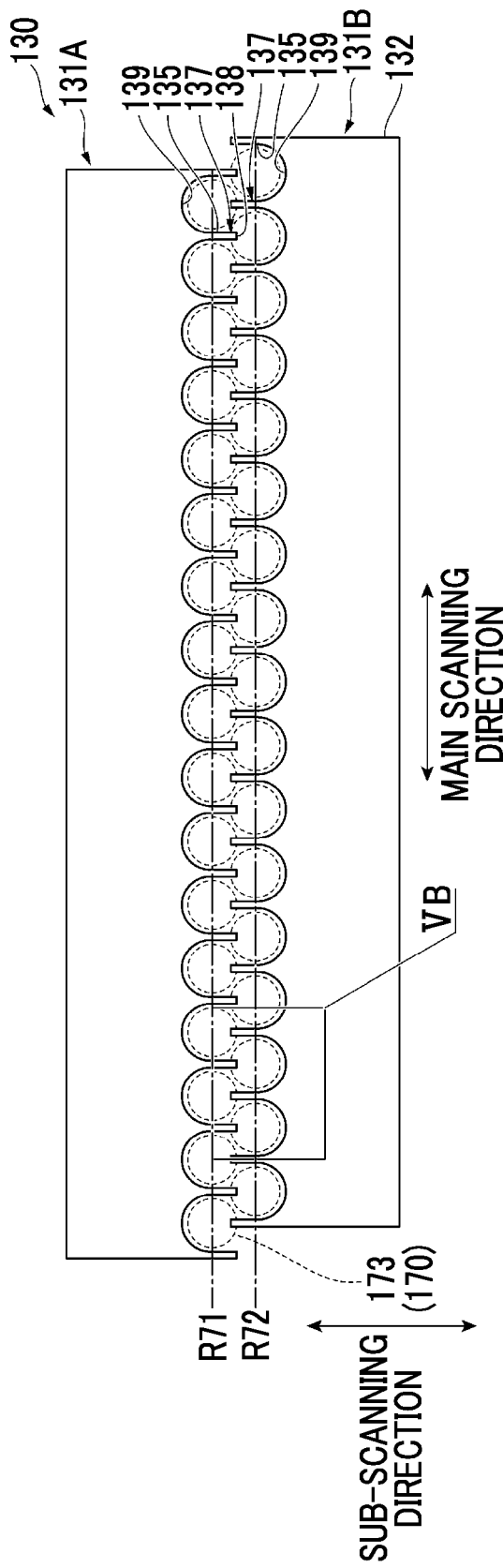
FIGS. 5-1A and 5-1B are diagrams for explaining arrangement of the light shielding wall.
Figures 1B, 5:
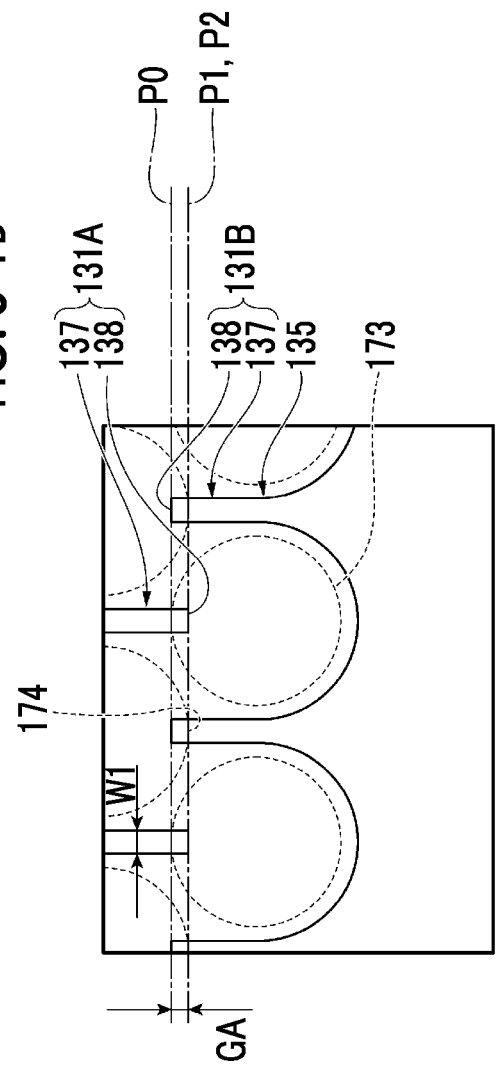
Figures 2C, 5:
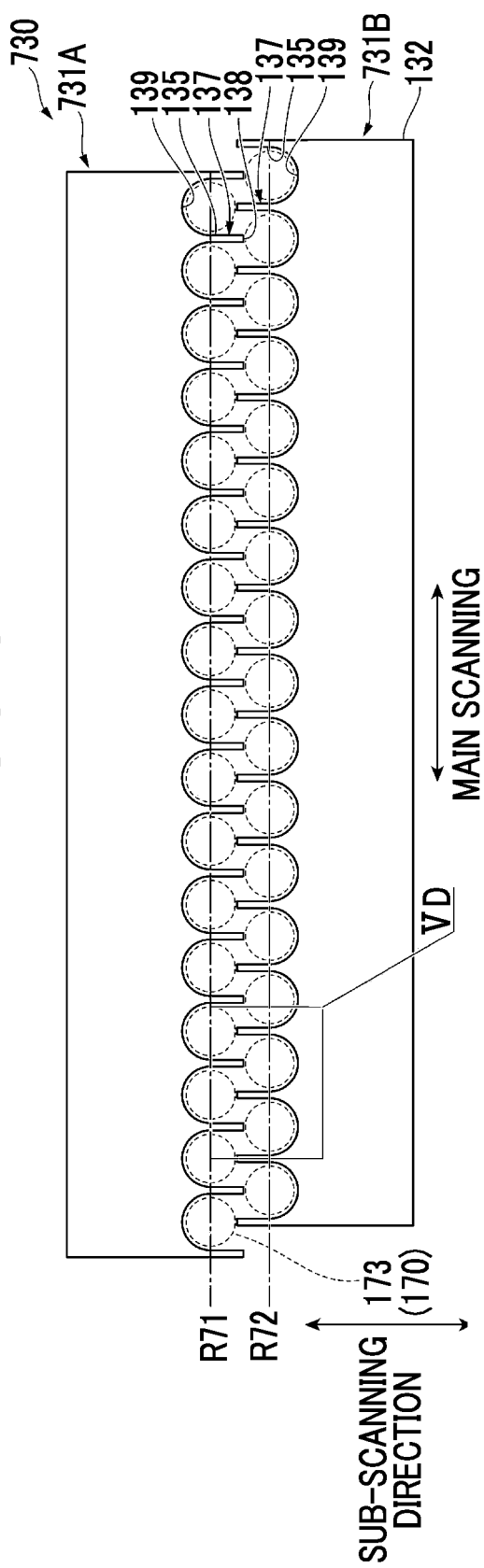
Figures 2D, 5:
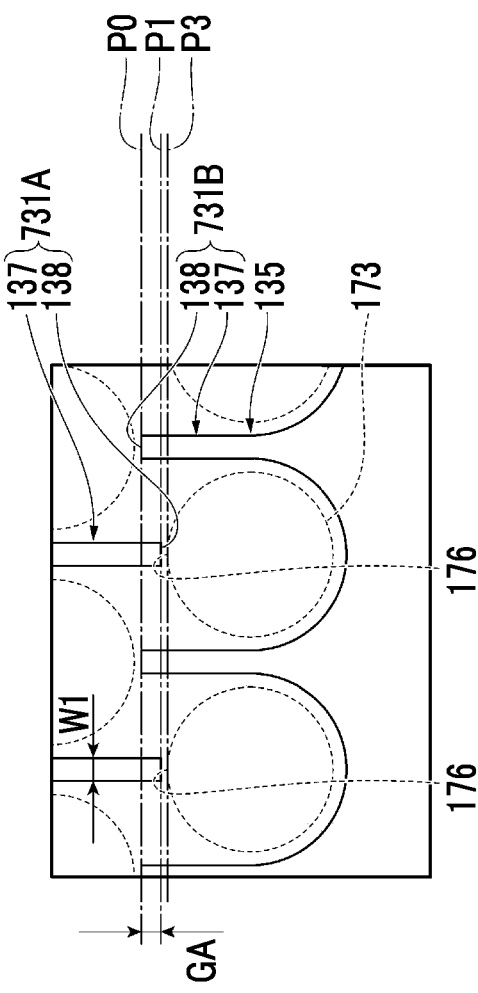

FIGS. 5-1A and 5-1B are diagrams for explaining arrangement of the light shielding wall 130. More specifically, FIG. 5-1A is a diagram showing a positional relationship between the first wall member 131A and the second wall member 131B, and FIG. 5-1B is an enlarged view along VB of FIG. 5-1A. FIGS. 5-2C and 5-2D are diagrams for explaining arrangement of the light shielding wall 730 in another exemplary embodiment. More specifically, FIG. 5-2C is a diagram showing a positional relationship between the first wall member 731A and the second wall member 731B, and FIG. 5-2D is an enlarged view along VD of FIG. 5-2C.

Hereinafter, the light shielding wall 130 will be described with reference to FIG. 3, FIGS. 4A and 4B, and FIGS. 5-1A and 5-1B.

As shown in FIG. 3, the light shielding wall 130 is configured such that two substantially rectangular parallelepiped wall members 131, that is, the first wall member 131A and the second wall member 131B are arranged. More specifically, the light shielding wall 130 has the first wall member 131A and the second wall member 131B facing each other with the optical axis of the first lens 173 interposed therebetween.

The first wall member 131A and the second wall member 131B are formed of a resin material mixed with black pigment (polycarbonate or acrylic resin), for example. In the shown example, the first wall member 131A and the second wall member 131B are the identical members. Detailed structures will be described as follows with the first wall member 131A as an example.

As shown in FIGS. 4A and 4B, the first wall member 131A is a substantially rectangular parallelepiped member. The first wall member 131A is disposed such that the longitudinal direction thereof is along the main scanning direction. For example, the first wall member 131A has a length L1 in the main scanning direction of 300 mm, a length L2 in the optical axial direction of 5 mm, and a length L3 in the sub-scanning direction of 2 mm. The first wall member 131A has a first side surface 133 whose normal line is along the sub-scanning direction. The first side surface 133 can be regarded as a surface of the first wall member 131A facing the second wall member 131B (see FIG. 3).

The first wall member 131A is a comb-teeth shape having a plurality of walls in the main scanning direction. More specifically, the first wall member 131A has a plurality of optical axis grooves 135 formed in the first side surface 133 along the optical axial direction. Also, a plurality of optical axis grooves 135 are provided in the main scanning direction at predetermined intervals. Each of the plurality of optical axis grooves 135 is formed at a position through which the optical axis of the first lens 173 passes. In addition, the interval between the optical axis grooves 135 in the main scanning direction coincides the interval between the first lenses 173 in the first lens array 170, and the interval between the second lenses 183 in the second lens array 180.

As shown in FIG. 4B, the first wall member 131A in which a plurality of optical axis grooves 135 are formed on the first side surface 133 can be regarded as a configuration having a base 132 whose longitudinal direction extends along the main scanning direction, and a plurality of projecting portions 137 projecting in the sub-scanning direction from the base 132. Here, tips 138 of the projecting portions 137 are disposed in the main scanning direction at predetermined intervals. Also, bottom portions 139 of the optical axis grooves 135 are disposed in the main scanning direction at predetermined intervals. The projecting portion 137 of the first wall member 131A is a portion interposed between the optical axis grooves 135 in the main scanning direction, and is a portion on the optical axis side of the first lens 173 from a virtual line IL connecting the bottom portions 139 of the optical axis grooves 135. The base 132 of the first wall member 131A is a portion on the side opposite to the optical axis side of the first lens 173 from the virtual line IL connecting the bottom portions 139 of the optical axis grooves 135. In the example shown in FIG. 4B, the base 132 is a substantially rectangular portion in a plan view.

As shown in FIG. 5-1A, the first wall member 131A and the second wall member 131B are disposed such that the first side surfaces 133 thereof on which the optical axis groove 135 is formed face each other (see FIG. 4A). As viewed along the optical axial direction shown in FIG. 5-1A, each of the optical axis grooves 135 is disposed to coincide with the first lens 173 and the second lens 183.

The first wall member 131A and the second wall member 131B configured as described above shield light not contributing to imaging of the first lens 173 and second lens 183. More specifically, the first wall member 131A and the second wall member 131B, a plurality of projecting portions 137 projecting in the sub-scanning direction form walls that shield light between the first lenses 173 in the main scanning direction. Because the projecting portion 137 forms a direction intersecting the optical axis, that is, an angle, light incident on the first lens 173 and the second lens 183 is shielded. Therefore, light incident from one lens of the first lens 173 and the second lens 183 onto the other lens adjacent in the main scanning direction is reduced.

Accordingly, field angles of the first lens 173 and the second lens 183 are narrowed, the focal depth can increase. Also, stray light may be less likely to occur in light passing through the first lens 173 and the second lens 183. Here, the field angle is a perspective angle of the ray of light with respect to the optical axial direction (an angle formed by the normal line and the ray of light). The stray light is light in which the ray of light emitted from an object point of an object surface reaches the position other than the corresponding image point on the image surface.

As described above, the first wall member 131A and the second wall member 131B are formed of the resin material mixed with black pigment. Therefore, the surface of the projecting portion 137, in other words, the inner surface of the optical axis groove 135 is also black. By making the surface of the projecting portion 137 black, light shielded by the projecting portion 137 suppressed from being reflected by the projecting portion 137.

As shown in FIG. 5-1A, the first wall member 131A and the second wall member 131B are disposed to be shifted from each other in the main scanning direction. More specifically, the first wall member 131A and the second wall member 131B are disposed to be shifted from each other in the main scanning direction by the interval between the first lenses 173 in the first lens array 170 or a half-length of the interval between the second lenses 183 in the second lens array 180. Accordingly, each of the optical axis grooves 135 of the first wall member 131A is disposed at a position corresponding to each of the first lens 173 in the first row R71 or the second lens 183 in the first row R81. Also, each of the optical axis grooves 135 of the second wall member 131B is disposed at a position corresponding to each of the first lens 173 in the second row R72 or the second lens 183 in the second row R82.

As shown in FIG. 5-1B, the tip 138 of one of the first wall member 131A and the second wall member 131B is disposed at a position entering inside the optical axis groove 135 of the other wall member. Specifically, in the sub-scanning direction, a position P0 of the tip 138 of the second wall member 131B projects to be closer to the bottom portion 139 (see FIG. 4B) of the first wall member 131A than a position P1 of the tip 138 of the first wall member 131A. More specifically, the tip 138 of the second wall member 131B projects further than a position P2 of an apex 174 of the first lens 173 on the second wall member 131B side.

The projecting portion 137 of the first wall member 131A and the projecting portion 137 of the second wall member 131B form an overlapping portion, a so-called overhang portion (see a region GA in FIG. 5-1B) in the sub-scanning direction. Due to the overhang portion, light entering from one target lens of the first lens 173 and the second lens 183 toward the other lens adjacent in the main scanning direction is more reliably reduced. In particular as shown in FIG. 5-1A, in a case where the distance between the first lens array 170 and the second lens array 180, that is, the interval between the first lens 173 and the second lens 183 in a direction intersecting the main scanning direction is narrowed, the optical performance of the first lens array 170 and the second lens array 180 is improved, for example, the light quantity of light reaching the light receiving element 74 increases (see FIG. 2). In the configuration in which the lenses overlap each other described above, in a case where the overhang portion is formed in the projecting portion 137, a part of the lens on the opposite side is covered by the tip 138 of the projecting portion 137. However, in this configuration, light toward the lens to be shielded can be further shielded as compared with a configuration without the overhang portion.

In general, in a case where the lens pitch in the first lens array 170 and the second lens array 180, that is, the interval between the first lens 173 and the second lens 183 in the main scanning direction is narrowed, the optical performance of the first lens array 170 and the second lens array 180 is improved, for example, the light quantity of light reaching the light receiving element 74 increases (see FIG. 2).

Unlike the present exemplary embodiment, for example, a configuration in which the light shielding wall 130 is formed in one rectangular parallelepiped shape and a plurality of through-holes (not shown) are formed at a position corresponding to the optical axis of the first lens 173 can be adopted. However, in such a configuration, in a case where the distance between the through-holes (not shown) of the light shielding wall 130 is narrowed in accordance with the narrow lens pitch in the first lens array 170 and the second lens array 180, for example, the wall thickness between the through-holes becomes thinner. The wall thickness becomes thinner than a predetermined thickness, for example, the wall thickness becomes 150 μm or less, in a case of carrying out injection molding, the fluidity of the resin material deteriorates in the thin portion, thus shaping failure may occur.

On the other hand, in a configuration having the first wall member 131A and the second wall member 131B like the light shielding wall 130 in the present exemplary embodiment, even in a case where the interval between the optical axis grooves 135 in the first wall member 131A and the second wall member 131B is reduced, shaping failure described above may be suppressed.

The shown optical axis groove 135 has a substantially U-shaped cross section. In other words, the bottom portion 139 of the optical axis groove 135 has a semicircular shape.

In other words, the projecting portion 137 has a curved surface that is curved along the outer periphery of the first lens 173 and the like. Since the projecting portion 137 has a shape along a part of the outer periphery of the first lens 173 and the like, stray light described above is less likely to occur. Regarding the description that the projecting portion 137 is along a part of the outer periphery of the first lens 173 and the like, the projecting portion 137 is not limited to a shape in which a gap between the projecting portion 137 and the outer peripheral surface of the first lens 173 is a predetermined size, however, the projecting portion 137 may have a shape in which the distance between the projecting portion 137 and the outer peripheral surface of the first lens 173 is changed, for example, the projecting portion 137 is curved in the same direction as the outer periphery of the first lens 173 and the like. In addition, the length of the projecting portion 137 in the main scanning direction, that is, the width of the projecting portion 137 decreases from the root side toward the tip 138. Thus, the operation of removing the projecting portion 137 from the mold in the injection molding process is facilitated as compared with a configuration in which the tip 138 is wider than other portions unlike the shown example.

As shown in FIGS. 5-2C and 5-2D, a configuration may be adopted in which the distance between the first lens array 170 and the second lens array 180, that is, the interval between the first lens 173 and the second lens 183 in a direction intersecting the main scanning direction is wider than the internal specified in the exemplary embodiment shown in FIGS. 5-1A and 5-1B, and the lenses do not overlap each other. In the first wall member 731A and the second wall member 731B in the exemplary embodiment, in the sub-scanning direction, the position P0 of the tip 138 of the second wall member 731B projects to be closer to the bottom portion 139 (see FIG. 4B) of the first wall member 731A than the position P1 of the tip 138 of the first wall member 731A. More specifically, the tip 138 of the second wall member 731B projects more than a position P3 of an apex 176 of the first lens 173 on the first wall member 731A side.

MODIFICATION EXAMPLE 1

FIGS. 6A to 6D are diagrams showing modification examples of a first light shielding film 110.

A modification example of the first light shielding film 110 will be described with reference to FIGS. 6A to 6D. In the above description, the first light shielding film 110 (see FIG. 6A) has the substantially circular first through-hole 113 formed in the first plate surface 111 having a substantially rectangular shape in a plan view, but the configuration is not limited thereto. As long as, the first light shielding film 110 is provided on the side opposite to the first lens 173 and the second lens 183 with the light shielding wall 130 interposed therebetween in the optical axial direction, and shields the part of light directed to the light shielding wall 130, the shape thereof is not particularly limited.

Figure 6A:
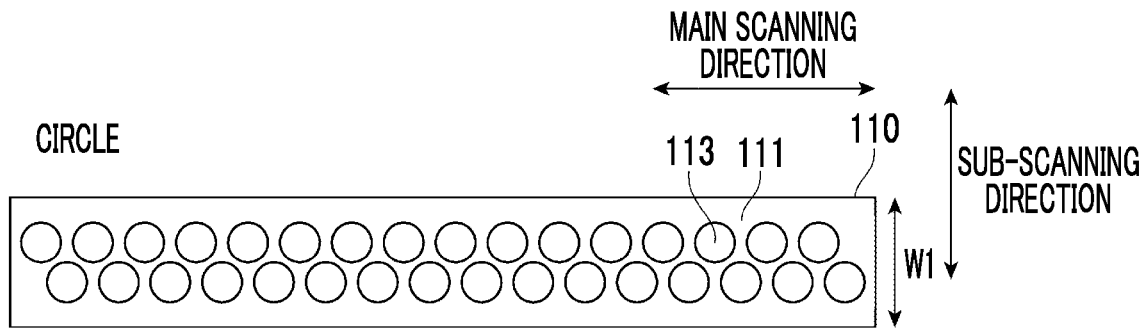
FIGS. 6A to 6D are diagrams showing modification examples of a first light shielding film.
Figure 6B:
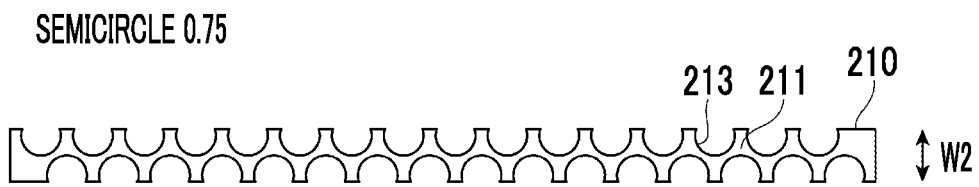

For example, as the first light shielding film 210 shown in FIG. 6B, a configuration having a substantially semicircular first through-hole 213 formed in the first plate surface 211 having a substantially rectangular shape in a plan view may be adopted. The first light shielding film 210 shown in FIG. 6B can be regarded as a shape in which both ends of the first light shielding film 110 (see FIG. 6A) in the width direction is cut off. For example, the length W1 in a width direction of the first light shielding film 110 is 2 mm, a length W2 in the width direction of the first light shielding film 210 is 0.75 mm.

Figure 6C:
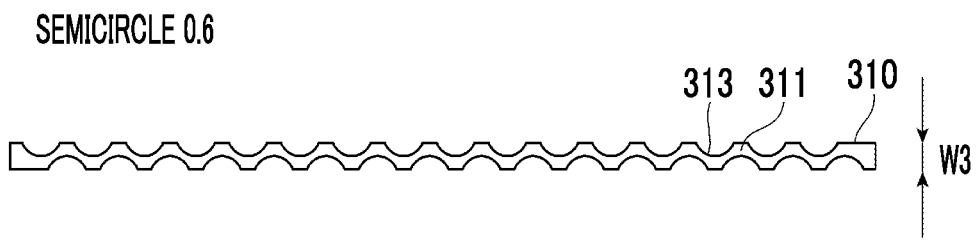

Also, similar the first light shielding film 310 shown in FIG. 6C, a configuration having the first through-hole 313 formed in the first plate surface 311 having a substantially rectangular shape in a plan view may be adopted. The first through-hole 313 has a substantially semicircular shape, more specifically, a so-called arch shape formed by a circular arc and chord occupying narrower region than the semicircle. The first light shielding film 310 shown in FIG. 6C can be regarded as a shape in which both ends of the first light shielding film 110 (see FIG. 6A) in the width direction is cut off. For example, the length W1 in the width direction of the first light shielding film 110 is 2 mm, the length W3 in the width direction of the first light shielding film 310 is 0.6 mm.

Figure 6D:
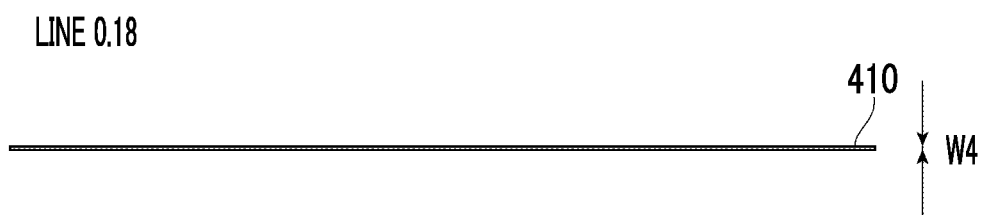

Also, similar to the first light shielding film 410 shown in FIG. 6D, the first light shielding film may have a substantially rectangular shape in a plan view. That is, a configuration not having the first through-hole 113 (see FIG. 6A) may be adopted. The first light shielding film 410 can be regarded as an elongate member disposed between the first row R71 and the second row R72 of the first lens 173 in the sub-scanning direction along the first row R71 and the second row R72. For example, the length W4 in the width direction of the first light shielding film 410 is 0.18 mm.

Figure 7A:
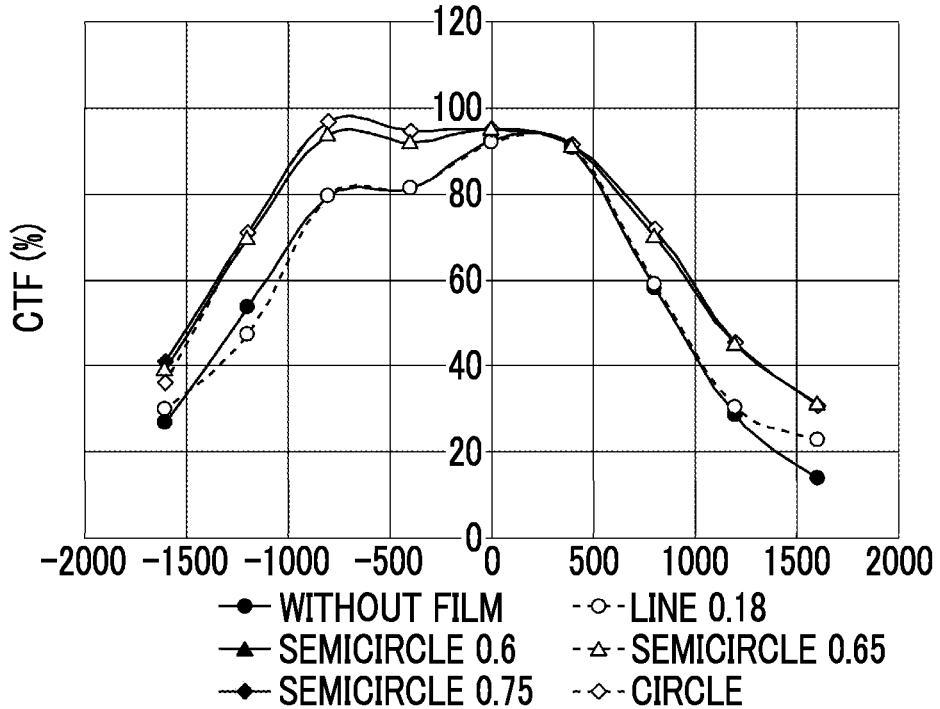
FIGS. 7A and 7B are diagrams showing results of simulation in which a shape of the first light shielding film is changed.
Figure 7B:
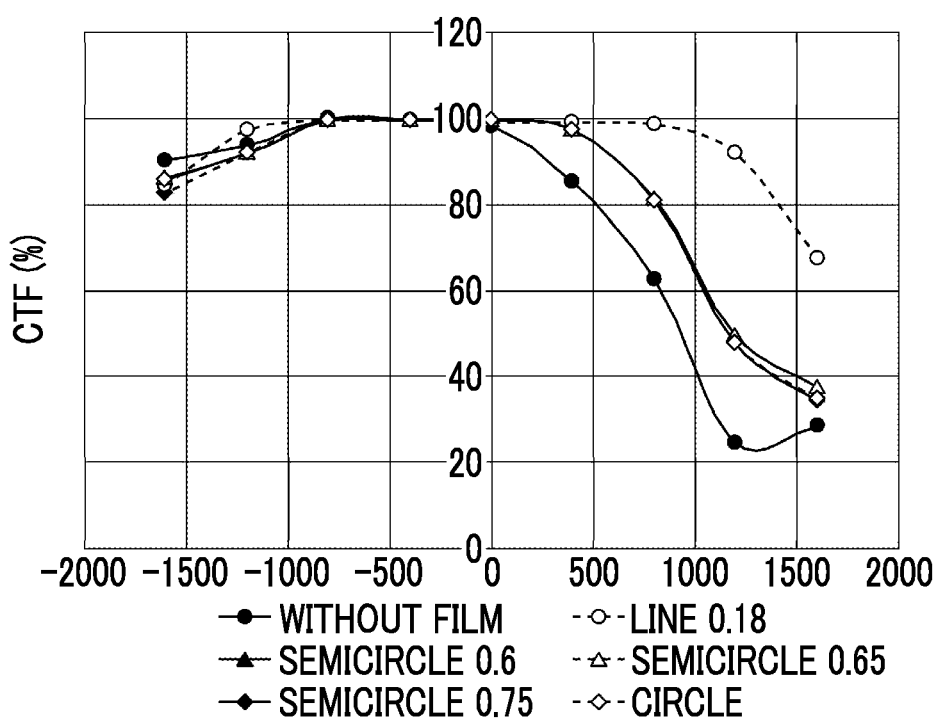

FIGS. 7A and 7B are diagrams showing results of simulation in which a shape of the first light shielding film 110 is changed. More specifically, FIG. 7A is a diagram showing a result of simulation of a relationship between the focal depth in the main scanning direction and the resolution (contrast transfer function: CTF) in a case where the shape of the first light shielding film 110 is changed. FIG. 7B is a diagram showing a result of simulation of a relationship between the focal depth in the sub-scanning direction and the resolution in a case where the shape of the first light shielding film 110 is changed.

Incidentally, the resolution in FIGS. 7A and 7B is a relative value of the density contrast of the read image on the document G in a case where the density contrast of the line image data to be written is 100%. A condition of the simulation is that first light shielding film 110 or the like of each shape is disposed on the stacked body in which the light shielding wall 130, the second light shielding film 150, the first lens array 170, the second lens array 180, and the third light shielding film 190 are stacked on top of each other in this order, as the lens array unit 10 shown in FIG. 2.

Note that "semicircle 0.6" is a shape in which both sides of the first light shielding film 110 in the sub-scanning direction are cut off and the length in the width direction of the first light shielding film is 0.6 mm. Further, for comparison, a condition in which the first light shielding film 110 is not provided is "without film". Also, "line 0.18" is the first light shielding film 410 in FIG. 6D, "semicircle 0.6" is the first light shielding film 310 in FIG. 6C, "semicircle 0.75" is the first light shielding film 210 in FIG. 6B, and "circle" is the first light shielding film 110 in FIG. 6A.

A simulation result in a case where the shape of the first light shielding film 110 is changed will be described with reference to FIGS. 6A to 6D and FIGS. 7A and 7B.

As shown in FIGS. 7A and 7B, regarding the above first light shielding films 110, 210, 310, and 410, and the first light shielding film of "semicircle 0.65" (not shown), the relationship between the focal depth in the main scanning direction and the resolution, and the relationship between the focal depth in the sub-scanning direction and the resolution are respectively simulated.

According to FIGS. 7A and 7B, greater resolution is obtained in "line 0.18", "semicircle 0.6", "semicircle 0.65", "semicircle 0.75", and "circle" as compared to "without film". That is, it is confirmed that the optical performance of the lens array unit 10 is improved by disposing the first light shielding film 110 or the like. Incidentally, it is confirmed that in the first light shielding film 410 which is "line 0.18", the resolution in the sub-scanning direction shown in FIG. 7B is greater as compared to "without film".

MODIFICATION EXAMPLE 2

FIG. 8 is a diagram for explaining a modification example of the light shielding wall 130.

FIGS. 9A and 9B are diagrams for explaining another modification example of the light shielding wall 130.

Hereinafter, a modification example of the light shielding wall 130 will be described with reference to FIGS. 8, 9A and 9B. In the following description, the identical components as the above exemplary embodiment may be assigned the identical reference numerals and the description may be omitted.

In the above description, the optical axis groove 135 formed in the light shielding wall 130 has a substantially U-shaped cross section and has a shape along the outer periphery of the first lens 173 and the second lens 183, but the configuration is not limited thereto. The optical axis groove 135 need only be configured to form a space along the optical axis of the first lens 173 in the light shielding wall 130.

For example, similar to the light shielding wall 230 shown in FIG. 8, the first wall member 231A and the second wall member 231B may be configured to include the optical axis groove 235 having a substantially rectangular cross section. In this configuration, the projecting portion 237 has a substantially rectangular parallelepiped shape as viewed in the optical axial direction. The first lens 173 and the second lens 183 are disposed in each of the optical axis grooves 235 as viewed in the optical axial direction. As compared with the optical axis groove 135 shown in FIG. 5-1A and the like, the distance between the projecting portion 237 and the first lens 173 and the second lens 183 in the optical axis groove 235 as viewed in the optical axial direction is large. Therefore, in the configuration shown in FIG. 8, for example, it is preferable that a shading film (not shown) is formed in the outer periphery of the first lens 173 in the first lens array 170 and the outer periphery of the second lens 183 in the second lens array 180, and stray light is shielded.

As the above description, the first lens array 170 includes the first lenses 173 of a plurality of rows, but the configuration is not limited thereto. For example, as shown in FIG. 9A, the first lens array 170 may have a configuration having the first lens 173 of one row. In a configuration in which the first lens array 170 includes the first lens 173 of one row, the light shielding wall 330 may be configured with one first wall member 331A. A plurality of optical axis grooves 135 is formed in the first wall member 331A and the first lens 173 is disposed in each of the optical axis grooves 135.

As shown in FIG. 9B, in a configuration in which the first lens array 170 has the first lens 173 of two rows, the light shielding wall 430 may be configured to have one first wall member 431A.

In such a configuration, the projecting portion 237 is formed to intersect both the first row R71 and the second row R72. Specifically, the projecting portion 237 has a first portion 437A disposed between the first lenses 173 in the first row R71 and extending in the sub-scanning direction, an inclined portion 437B extending in a direction inclined respect to the sub-scanning direction from the first portion 437A, and the second portion 437C extending in the sub-scanning direction from the inclined portion 437B and passing through the first lenses 173 in the second row R72. In addition, unlike the example shown in FIG. 9B, the projecting portion 137 may have a configuration that does not have a portion extending in the sub-scanning direction. For example, all of the projecting portions 137 may be configured to extend in a direction inclined with respect to the sub-scanning direction.

MODIFICATION EXAMPLE 3

Figure 10A:
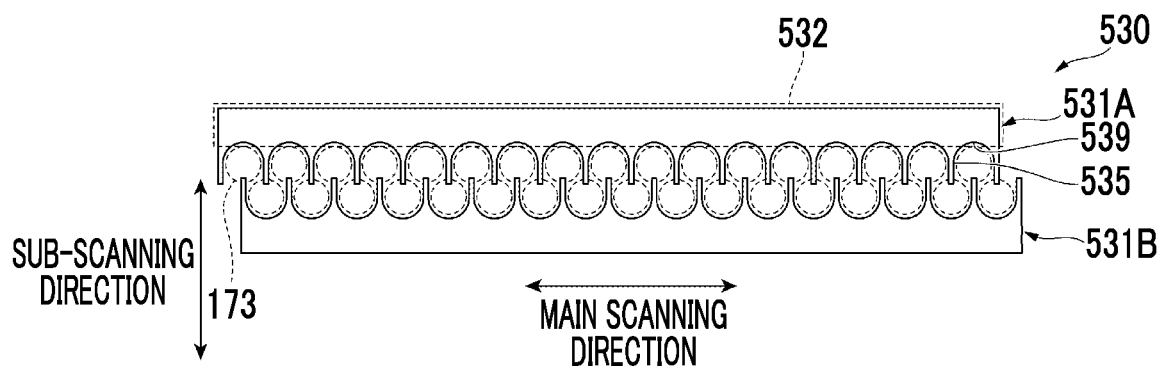
FIGS. 10A to 10C are diagrams for explaining still another modification example of the wall member.
Figure 10B:
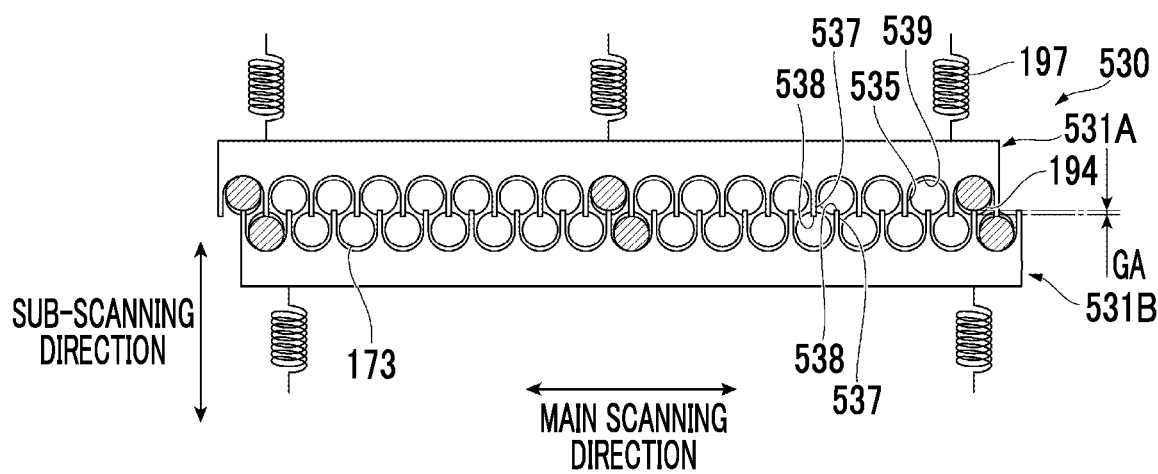
Figure 10C:
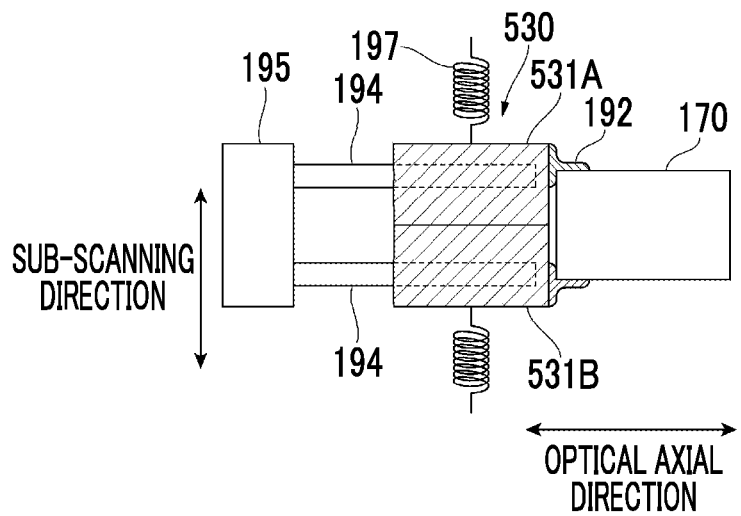

FIGS. 10A to 10C are diagrams for explaining still another modification example of the light shielding wall 130. More specifically, FIG. 10A is a diagram showing the light shielding wall 530 as viewed along the optical axial direction, FIG. 10B is a diagram showing the light shielding wall 530 supported by a positioning pin 194 as viewed along the optical axial direction, and FIG. 10C is a diagram showing the light shielding wall 530 supported by the positioning pin 194 as viewed along the main scanning direction.

Hereinafter, a modification example of the light shielding wall 130 will be described with reference to FIGS. 10A to 10C.

In the above description, the optical axis groove 135 has a substantially U-shaped cross section and has a shape along the outer periphery of the first lens 173 and the second lens 183, but the configuration is not limited thereto. For example, similar to the light shielding wall 530 shown in FIG. 10A, the optical axis groove 535 may be formed such that the bottom portion 539 of the optical axis groove 535 formed in the first wall member 531A and the second wall member 531B, that is the inside of the wall is positioned so as to be separated from the first lens 173, as viewed in the optical axial direction. In other words, the first lens 173 may be separated from the base 532 as viewed in the optical axial direction. In other words, the depth of the optical axis groove 535 may be formed deeper by the region GA than the diameter of the first lens 173.

By forming the optical axis groove 535 deeply as described above, the operation of assembling the light shielding wall 530 is facilitated. Hereinafter, the process of fixing the light shielding wall 530 to the first lens array 170 will be specifically described. In the shown process, a plurality of positioning pins 194 that position the first wall member 531A and the second wall member 531B, a supporting member 195 that supports a plurality of positioning pins 194 and moves in response to driving of a drive source (not shown), and a spring 197 that presses the first wall member 531A and the second wall member 531B are used. The positioning pin 194 has the same diameter as the curvature of the U-shaped portion.

In the shown example, three positioning pins 194 are used for positioning each of the first wall member 531A and the second wall member 531B. More specifically, the positioning pins 194 are disposed in the optical axis grooves 535 that are positioned at both ends and in the center among the optical axis grooves 535 arranged in the main scanning direction of each of the first wall member 531A and the second wall member 531B.

First, the supporting member 195 driven by the drive source (not shown) is disposed with respect to the first lens array 17C such that the positioning pins 194 are positioned at predetermined positions. Then, the first wall member 531A and the second wall member 531B pressed by the spring 197 are pressed against the positioning pins 194 positioned with respect to the first lens array 170. That is, the positioning pins 194 are disposed in the optical axis grooves 535 provided at both ends and in the center of each of the first wall member 531A and the second wall member 531B.

As described above, in a state where the positions of the first wall member 531A and the second wall member 531B are determined, for example, an ultraviolet ray curable adhesive 192 is applied between the first wall member 531A, the second wall member 531B, and the first lens array 170. Then the first wall member 531A and the second wall member 531B are fixed to the first lens array 170 by irradiating the adhesive 192 with ultraviolet rays. After being fixed, the positioning pins 194 are removed. In a configuration in which the positioning pins 194 are removed, the positioning pins 194 can be disposed on the optical axis of the first lens 173, and the distance between the first wall member 531A and the second wall member 531B and the first lens 173 is reduced.

As shown in FIG. 10B, in a state where the first wall member 531A and the second wall member 531B are fixed to the first lens array 170, the bottom portion 539 of the optical axis groove 535 is disposed at a position separated from the first lens 173 as viewed in the optical axial direction. Accordingly, the positioning pin 194 that positions the first wall member 531A does not interfere with the tip 538 of the projecting portion 537 in the second wall member 531B. Also, the positioning pin 194 that positions the second wall member 531B does not interfere with the tip 538 of the projecting portion 537 in the first wall member 531A. The projecting portion 137 of the first wall member 131A and the projecting portion 137 of the second wall member 131B can form the overhang portion (see the region GA in FIG. 10B) in the sub-scanning direction.

MODIFICATION EXAMPLE 4

Figure 11A:
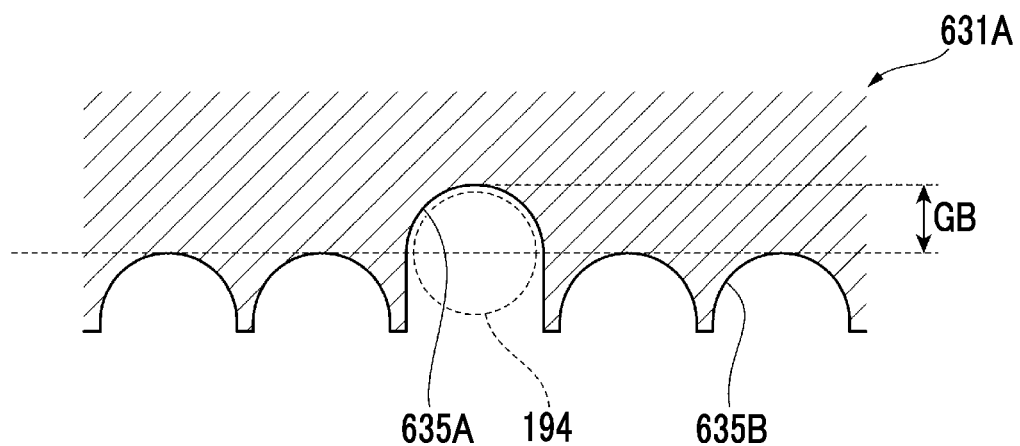
FIGS. 11A and 11B are diagrams for explaining still another modification example of the wall member.
Figure 11B:
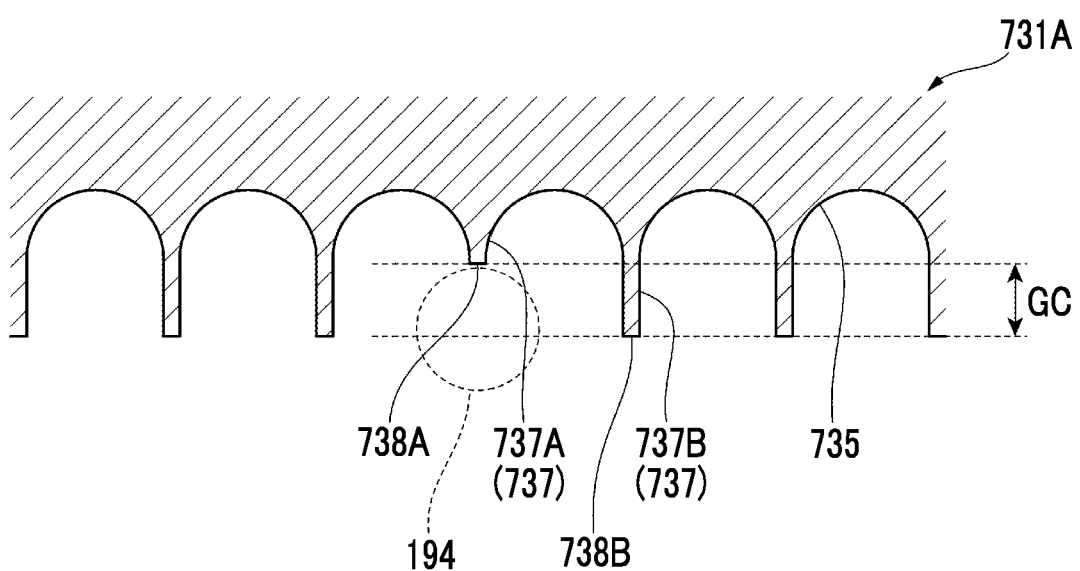

FIGS. 11A and 11B are diagram for explaining still another modification example of the light shielding wall 130. More specifically, FIG. 11A is a diagram showing the first wall member 631A and FIG. 11B is a diagram showing the first wall member 731A.

Hereinafter, still another modification example of the light shielding wall 130 will be described with reference to FIGS. 11A and 11B.

In the modification example 3, it is described that all of the optical axis grooves 535 are formed deeper than the dimension of the first lens 173 as a configuration for forming the overhang portion to the projecting portions 537 of the first wall member 531A and the second wall member 531B, but the configuration is not limited thereto.

For example, a part of optical axis grooves 635A may be formed deeper than the other optical axis grooves 635B as in the first wall member 631A shown in FIG. 11A (see the distance GB in FIG. 11A). The positioning pins 194 are disposed in a part of the optical axis grooves 635A that are deeply formed, the distance between other optical axis grooves 635B without the positioning pins 194 and the first lens 173 is suppressed, and the overhang portion is formed.

In addition, for example, as in the first wall member 731A shown in FIG. 11B, in a configuration in which a plurality of optical axis grooves 735 are formed and a plurality of projecting portions 737 are provided, the tip 738A of a part of projecting portions 737A may be formed lower than the tip 738B of the other projecting portions 737B (see a distance GC in FIG. 11B). The positioning pins 194 are disposed to the positions facing a part of the projecting portion 737A that are formed low, the distance between other projecting portion 737B and the first lens 173 is suppressed, and the overhang portion is formed.

Also, positioning by the positioning pin 194 may be performed in a configuration in which the light shielding wall 130 does not have a curved surface, and in this case, the positioning is performed by point contact. Furthermore, in this case, the positioning pin 194 that has a diameter corresponding to the gap between the adjacent projecting portions 137 is used, and three surfaces of the projecting portion contact the positioning pin 194.

The shape of the positioning pin 194 can be other than a perfect circle, but in a case where the shape is a perfect circle, it is easy to use a general purpose item and easy to position. Further, in a case where the diameter of the perfect circle is made smaller than the diameter of the curved portion and the first lens 173 and the bottom portion 139 are not separated from each other, the positioning accuracy is lowered, but the difference between the first lens 173 and the bottom portion 139 hardly occurs.

The positioning pin 194 may be configured to come into contact with the mating projecting portion 137, however, in order to reduce the possibility of interference, the positioning pin 194 is separated from the projecting portion 137 by the dimensional error so as to be positioned in the bottom portion 139 instead of the projecting portion 137.

MODIFICATION EXAMPLE 5

Figure 12:
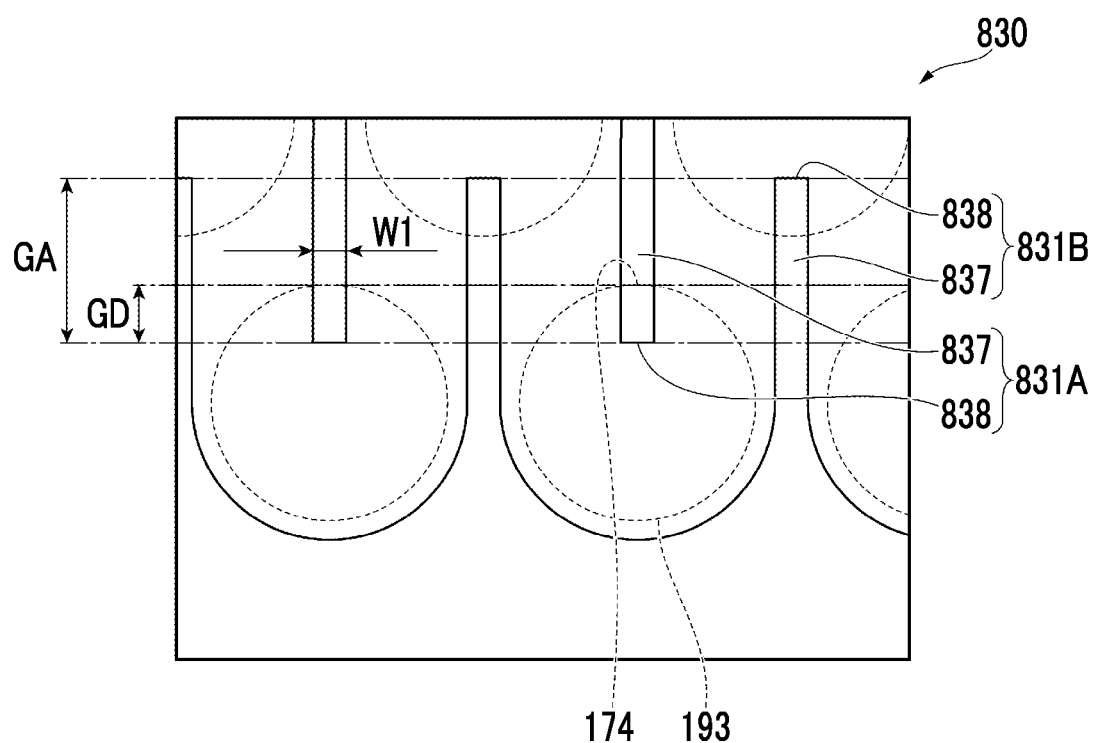
FIG. 12 is a diagram showing a positional relationship between a first wall member and a second wall member.

FIG. 12 is a diagram showing a positional relationship between a first wall member 831A and a second wall member 831B.

Another modification example of the light shielding wall 130 will be described with reference to FIG. 12.

In the examples shown in FIGS. 5-1A and 5-1B and the like, the configuration in which the projecting portion 137 does not overlap the first lens 173 and the second lens 183 as viewed in the optical axial direction is described, but the configuration is not limited thereto. For example, similar to the light shielding wall 830 shown in FIG. 12, the projecting portion 837 may overlap the first lens 173 and the second lens 183 (see FIG. 3) as viewed in the optical axial direction.

More specifically, for example, in a case where the diameters of the first lens 173 and the second lens 183 are 0.4 mm and the width W1 of the projecting portion 837 is 0.1 mm to 0.15 mm, the projecting portion 837 may be configured such that a portion of 0.1 mm (see a distance GD in FIG. 12) from the tip 838 overlaps the first lens 173 and the second lens 183. That is, as viewed in the optical axial direction, the dimension of the projecting portion 837 overlapping the first lens 173 and the second lens 183 (see the distance GD in FIG. 12) may be half or less of the diameters of the first lens 173 and the second lens 183, more specifically, may be quarter or less of the first lens 173 and the second lens 183. With such a configuration, as viewed in the optical axial direction, the overhang portion (see the region GA in FIG. 12) becomes longer and light entering the adjacent lens in the main scanning direction is more reliably reduced as compared with a configuration in which the projecting portion 137 does not overlap the first lens 173 and the second lens 183.

OTHER MODIFICATION EXAMPLES

In the above description, the first light shielding film 110 is provided, but it is not limited to the film-like shape or materials. For example, the first light shielding film 110 may be configured with a plate-like member having higher rigidity than rigidity of the film. That is, a configuration having a light shielding plate instead of the first light shielding film 110 may be adopted. Furthermore, a configuration not having the first light shielding film 110 may be adopted.

Also, a configuration in which the first through-holes 113, 213, or 313 are provided in the first light shielding film 110 is described, but the configuration is not limited thereto as long as the configuration transmits light. For example, a configuration in which the first through-holes 113, 213, or 313 are covered with a film or a plate transparent with respect to light emitted from the light source 73 may be adopted.

In the lens array unit 10 described above, the light shielding wall 130 is provided on the side opposite to the light receiving element 74 with the first lens array 170 and the second lens array 180 interposed therebetween, however, the light shielding wall 130 may be configured to be provided on the light receiving element 74 side than on the first lens array 170 and second lens array 180 side.

The position of the lens array unit 10 in the document reading apparatus 1 is not fixed. For example, the lens array unit 10 may be provided in the movement unit that reciprocates in a linear reading direction (sub-scanning direction). More specifically, the movement unit may be configured to have the irradiation unit that irradiates a document with light, the lens array unit 10, and the light receiving unit that receives light passing through the lens array unit 10.

The lens array unit 10 is described to be provided in the document reading apparatus 1, but the configuration is not limited thereto. For example, the lens array unit 10 may be provided to the optical device other than the document reading apparatus 1 such as an imaging device that images light emitted from light emitting diode on the image holding body.

The first lens 173 described above is an example of the lens body. The light shielding wall 130 is an example of the light shielding body. The first wall member 131A is an example of the first light shielding body. The second wall member 131B is an example of the second light shielding body. The base 132 of the first wall member 131A is an example of the first base. The projecting portion 137 of the first wall member 131A is an example of the first projecting portion. The base 132 of the second wall member 131B is an example of the second base. The projecting portion 137 of the second wall member 131B is an example of the second projecting portion. The first light shielding film 110 is an example of the cover member. The first through-hole 113 is an example of the passing region. The inner surface of the optical axis groove 135 is an example of the side surface along the optical axis of the lens. The light source 73 is an example of the irradiation unit. The light receiving element 74 is an example of the light receiving element. The document reading apparatus 1 is an example of the image reading apparatus. The main scanning direction is an example of the arrangement direction. The sub-scanning direction is an example of the intersection direction. The tip 138 of the first wall member 131A is an example of the first tip. The tip 138 of the second wall member 131B is an example of the second tip.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical device comprising:
a lens body including a plurality of lenses of which optical axes are arranged alongside each other; and
a light shielding body that is disposed with respect to the lens body and shields a part of light passing through the plurality of lenses, that has a base that is provided, at a position shifted from the optical axes of the plurality of lenses, along an arrangement direction in which the plurality of lenses are arranged, and that has a plurality of projecting portions that are positioned between the plurality of lenses and project from the base in an intersection direction intersecting the arrangement direction,
wherein the plurality of lenses are provided in a first row and a second row along the arrangement direction,
the light shielding body includes
a first light shielding body having a first base that is provided, at a position shifted from the optical axes of the lenses in the first row, along the arrangement direction, and a plurality of first projecting portions that are positioned between the lenses in the first row and project from the first base in the intersection direction, and
a second light shielding body having a second base that is provided, at a position shifted from the optical axes of the lenses in the second row, along the arrangement direction on an opposite side of the first base with the lenses of the first row and the lenses of the second row interposed therebetween, and a plurality of second projecting portions that are positioned between the lenses in the second row and project from the second base in the intersection direction,
wherein a first tip of the first light shielding body is disposed closer to the second base side than a second tip of the second light shielding body in the intersection direction.

2. The optical device according to claim 1,
wherein the lenses in the first row and the lenses in the second row are provided at positions where the lenses in the first row and the lenses in the second row overlap each other in the intersection direction.

3. The optical device according to claim 2,
wherein the lenses in the first row are separated from the base of the first light shielding body as viewed in a direction along the optical axes of the lenses.

4. The optical device according to claim 1, further comprising:
a cover member that is provided on an opposite side of the lens body with the first light shielding body and the second light shielding body interposed therebetween in a direction along the optical axis of the lens, and covers facing regions of the first light shielding body and the second light shielding body.

5. The optical device according to claim 4,
wherein the cover member includes a passing region through which light passes on each of the optical axes of the plurality of lenses.

6. The optical device according to claim 5,
wherein the cover member has a thickness thinner than a thickness of each the first light shielding body and the second light shielding body in a direction along the optical axis of the lens.

7. The optical device according to claim 1,
wherein each of the projecting portions has a curved surface along a part of an outer periphery of the lens.

8. The optical device according to claim 1,
wherein the projecting portion extends between the lenses from the base, and
a tip of the projecting portion projects to a position farther from the base than the lenses.

9. An optical device comprising:
a lens body including a plurality of lenses of which optical axes are arranged alongside each other; and
a light shielding body that is disposed with respect to the lens body and shields a part of light passing through the plurality of lenses, and that has a base body that is provided, at a position shifted from the optical axes of the plurality of lenses, along an arrangement direction in which the plurality of lenses are arranged, the base body including a plurality of side surfaces along the optical axis of each lens of the plurality of lenses,
wherein the plurality of lenses are provided in a first row and a second row along the arrangement direction,
the light shielding body includes
a first light shielding body having a first base that is provided, at a position shifted from the optical axes of the lenses in the first row, along the arrangement direction, and a plurality of first projecting portions that are positioned between the lenses in the first row and project from the first base in the intersection direction, and
a second light shielding body having a second base that is provided, at a position shifted from the optical axes of the lenses in the second row, along the arrangement direction on an opposite side of the first base with the lenses of the first row and the lenses of the second row interposed therebetween, and a plurality of second projecting portions that are positioned between the lenses in the second row and project from the second base in the intersection direction,
wherein a first tip of the first light shielding body is disposed closer to the second base side than a second tip of the second light shielding body in the intersection direction.

10. An image reading apparatus comprising:
an irradiation unit that irradiates a document with light;
a lens body including a plurality of lenses of which optical axes are arranged alongside each other and through which light reflected from the document passes;
a light shielding body that is disposed with respect to the lens body and shields a part of light passing through the plurality of lenses, that has a base that is provided, at a position shifted from the optical axes of the plurality of lenses, along an arrangement direction in which the plurality of lenses are arranged, and that has a plurality of projecting portions that are positioned between the plurality of lenses and project from the base in an intersection direction intersecting the arrangement direction; and
a light receiving unit that receives light passing through the plurality of lenses, wherein the irradiation unit, the lens body, and the light receiving unit are movement units that integrally move, wherein the plurality of lenses are provided in a first row and a second row along the arrangement direction, the light shielding body includes
- a first light shielding body having a first base that is provided, at a position shifted from the optical axes of the lenses in the first row, along the arrangement direction, and a plurality of first projecting portions that are positioned between the lenses in the first row and project from the first base in the intersection direction, and
- a second light shielding body having a second base that is provided, at a position shifted from the optical axes of the lenses in the second row, along the arrangement direction on an opposite side of the first base with the lenses of the first row and the lenses of the second row interposed therebetween, and a plurality of second projecting portions that are positioned between the lenses in the second row and project from the second base in the intersection direction, wherein a first tip of the first light shielding body is disposed closer to the second base side than a second tip of the second light shielding body in the intersection direction.

* * * * *